Dec. 25, 1934. F. A. WOOD Re. 19,407

FOOTWEAR

Original Filed March 13, 1931

Inventor:—
Frederick A. Wood,
By Smith, Michael & Gardiner,
Attorneys.

Reissued Dec. 25, 1934

Re. 19,407

UNITED STATES PATENT OFFICE 19,407

FOOTWEAR

Frederick Arthur Wood, Shepherds Bush, London, England

Original No. 1,892,596, dated December 27, 1932, Serial No. 522,343, March 13, 1931. Application for reissue June 30, 1934, Serial No. 733,343. In Great Britain March 13, 1930

14 Claims. (Cl. 36—12)

This invention relates to a boot or shoe in which the outsole is preferably of crepe rubber and the main object of the invention is the provision of means to cover the upper portion of the outsole to prevent the latter from spreading and to wholly or partly conceal it from view.

Another object of the invention is to provide an improved attaching means for the outsole.

A further object is generally to provide a boot or shoe of improved construction.

In order that the invention may be the more clearly understood a shoe in accordance therewith will now be described, reference being made to the accompanying drawing wherein.

Figure 1:
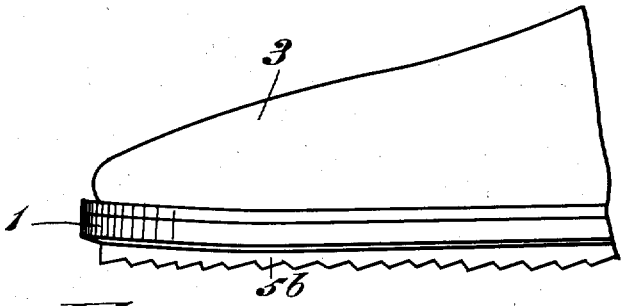
Figure 1 is a side elevation of the forward part of the shoe.
Figure 2:
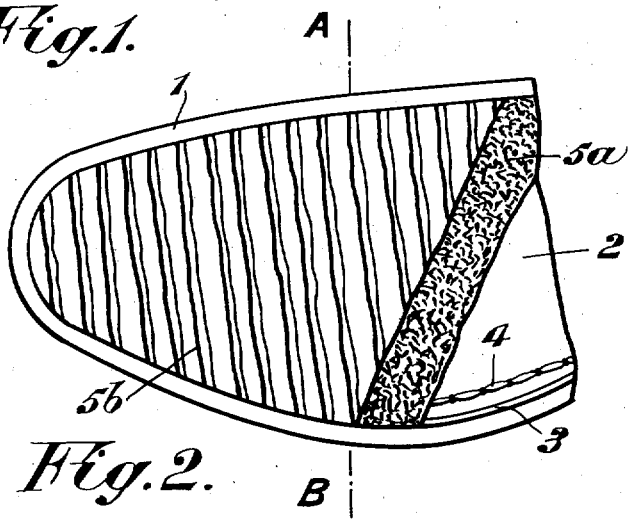
Figure 2 is an under plan of the same with portions of the layers of the outer sole removed.
Figure 3:
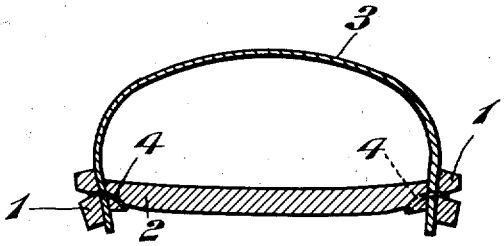
Figure 3 is a section on line A—B of Figure 2 but with the shoe in a half finished state.

Referring to the drawing, a rand or strip 1 of relatively thick leather such as English butt leather, arranged in a vertical plane with its upper edge located above the under surface of the insole 2 and with its lower edge located below and depending, say rather less than a quarter of an inch beneath the under surface of the insole 2, is sewn completely around the shoe outside the upper 3 by the same set of stitches 4 whereby said upper is sewn to said insole. The underneath cavity thus formed (Figure 3) has rubber solution applied over its entire surface (that is the under surface of the insole 2 and the inner side of the downwardly projecting portion of the rand 1) and an outsole of crepe rubber for example, is thus secured in said cavity. It is found that stronger adhesion is obtained by making this outsole of two layers 5*a* and 5*b* the inner of which (5*a*) is relatively thin (see Figure 4). As shown the thickness of this crepe rubber sole is greater than the depth of said cavity so that the under surface of the layer 5*b* is considerably below the lower edge of the rand 1 and, therefore, constitutes the tread surface. At the same time the crepe rubber is prevented by said rand from spreading and moreover is practically concealed when the shoe is in use.

The set of stitches 4 connecting the upper 3 and the rand 1 to the insole 2 pass from the bottom of a groove cut in the under surface of said insole and about a quarter of an inch from the edge to the bottom of a groove cut in the outer side of the rand. The stitches pass through the middle of the peripheral edge surface of the insole 2 and through the upper 3 which lies between said edge surface and the inner side of the rand 1, abutting said edge of the insole and said side of the rand, the other or outer side of the rand being exposed.

Figure 4:
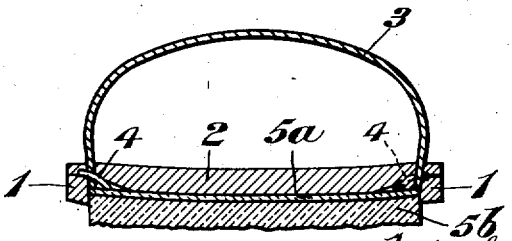
Figure 4 is a similar cross section of the shoe in the finished state.

The groove in the outer side of the rand is afterwards closed up with the aid of adhesive solution as shown in Figure 4 and said outer side is duly polished.

It will be appreciated that although specially suitable for footwear with an outsole of crepe rubber any other material may be cemented in the aforesaid cavity constituted by the insole and the rand. For example, ordinary rubber, or, in some cases, leather might be employed. As other changes will occur to those skilled in this art, although I prefer the specific construction herein described, I do not wish to be limited thereto except as may be required by the appended claims and the prior art.

What I claim and desire to secure by Letters Patent is:—

1. A boot or shoe comprising an upper, an insole secured inside said upper, a rand secured outside said upper with one side presented to the edge surface of the insole, the other side exposed, and one edge depending beneath the under surface of the insole, and an outer sole independently secured with its upper portion within the underneath cavity constituted by the downwardly depending portion of the rand.

2. A boot or shoe comprising an upper, an insole secured inside said upper, a rand secured outside said upper with its lower portion depending beneath the under surface of said insole, the securement of said upper, insole and rand being effected by a common set of stitches passing through the edge surface of said insole and one side of said rand, the other side of said rand being exposed, and an outer sole independently secured with its upper portion within the underneath cavity constituted by the depending portion of the rand.

3. A boot or shoe comprising an upper, an insole secured inside said upper, a rand secured outside said upper with one side presented to the edge surface of the insole and the other side exposed and one edge beneath the under surface of said insole, the securement of said upper, insole and rand being effected by a common set of stitches passing through the edge surface of the said insole, and an outer sole independently secured with its upper portion within the underneath cavity constituted by the downwardly depending portion of the rand.

4. A boot or shoe comprising an upper, an insole secured inside said upper, a rand secured outside said upper with one side presented to the edge surface of the insole and the other side exposed and one edge depending beneath the under surface of said insole, the securement of said upper, insole and rand being effected by a common set of stitches passing through the edge surface of said insole, and an outer sole of crepe rubber independently secured by means of a suitable adhesive with its upper portion within the underneath cavity constituted by the downwardly depending portion of the rand, and its lower portion projecting considerably beneath the lower edge of the rand.

5. A boot or shoe comprising an upper, an insole, and a rand secured together, with the upper abutting one side of the rand and the peripheral edge of the insole and terminating at said edge and with the upper and lower edges of the rand located, respectively, above and below the under surface of the insole, said rand outlining a cavity below the insole, and an outsole secured in said cavity.

6. A boot or shoe comprising an upper, an insole, and a rand secured together, with the upper abutting one side of the rand and the peripheral edge of the insole and with the upper and lower edges of the rand located, respectively, above and below the under surface of the insole, said rand outlining a cavity below the insole, and an outsole secured in said cavity.

7. A boot or shoe comprising an upper, an insole, and a rand secured together, with the upper abutting one side of the rand and the peripheral edge of the insole and with the upper and lower edges of the rand located, respectively, above and below the under surface of the insole, said rand outlining a cavity below the insole and an outsole secured in said cavity and projecting below the lower edge of said rand.

8. A boot or shoe comprising an upper, an insole, and a rand secured together with the upper abutting one side of the rand and the peripheral edge of the insole, the other side of the rand being exposed, said rand depending below the under surface of the insole forming a cavity therewith, and an outsole secured in said cavity.

9. A boot or shoe comprising an upper, an insole, and a rand secured together with the upper abutting one side of the rand and the peripheral edge of the insole, the other side of the rand being exposed, said rand depending below the under surface of the insole forming a cavity therewith, and an outsole secured in said cavity and projecting below the lower edge of said rand.

10. A boot or shoe comprising an upper, an insole, and a rand secured together with the upper abutting one side of the rand and the peripheral edge of the insole, the other side of the rand being exposed and the upper and lower edges of the rand located, respectively, above and below the under surface of the insole, said rand outlining a cavity below the insole, and an outsole secured in said cavity.

11. A boot or shoe comprising an upper, an insole, and a rand secured together with the upper abutting one side of the rand and the peripheral edge of the insole, the other side of the rand being exposed and the upper and lower edges of the rand located, respectively, above and below the under surface of the insole, said rand outlining a cavity below the insole, and an outsole secured in said cavity and projecting below the lower edge of said rand.

12. A boot or shoe comprising an upper, an insole, and a vertical relatively thick leather rand secured together, with the upper abutting one side of the rand and the peripheral edge of the insole and with the upper and lower edges of the rand located, respectively, above and below the under surface of the insole, said rand outlining a cavity below the insole, and a rubber outsole secured within said cavity and projecting below the lower edge of said rand.

13. A boot or shoe comprising an upper, an insole, and a relatively thick leather rand secured together, with the upper abutting one side of the rand and the peripheral edge of the insole and with the upper and lower edges of the rand located, respectively, above and below the under surface of the insole, said rand outlining a cavity below the insole, and an outsole secured in said cavity.

14. A boot or shoe comprising an upper, an insole secured inside said upper, a rand secured outside said upper with its lower portion depending beneath the under surface of said insole to form a cavity, the securement of said upper insole and rand being effected by a common set of stitches passing through the edge surface of said insole and one side of said rand, and a rubber outsole comprising an upper layer located wholly within said cavity and cemented to said insole and a lower layer having its upper portion within said cavity and cemented to said upper layer and having its lower portion projecting below the lower edge of said rand.

FREDERICK ARTHUR WOOD.